United States Patent
Park et al.

(10) Patent No.: US 8,869,384 B2
(45) Date of Patent: Oct. 28, 2014

(54) ELECTRIC BUS BATTERY EXCHANGE STATION

(75) Inventors: Jun Seok Park, Seoul (KR); Won-Kyu Kim, Seoul (KR); Won-Jae Jung, Chuncheon-si (KR)

(73) Assignees: Kookmin University Industry Academy Cooperation Foundation, Seoul (KR); Industry-University Cooperation Foundation of Korea Aerospace University, Goyang-Si, Gyeonggi-Do (KR)

( * ) Notice: Subject to any disclaimer, the term of this patent is extended or adjusted under 35 U.S.C. 154(b) by 127 days.

(21) Appl. No.: 13/539,481

(22) Filed: Jul. 1, 2012

(65) Prior Publication Data

US 2013/0192060 A1 Aug. 1, 2013

(30) Foreign Application Priority Data

Jan. 31, 2012 (KR) ........................ 10-2012-0010069

(51) Int. Cl.
*B60S 5/06* (2006.01)
*H01M 6/50* (2006.01)
*H01M 10/42* (2006.01)

(52) U.S. Cl.
USPC ................. 29/730; 29/763; 104/34; 424/277; 424/462

(58) Field of Classification Search
USPC ........ 29/730, 729, 763; 414/277, 462; 104/34
See application file for complete search history.

(56) References Cited

U.S. PATENT DOCUMENTS

| | | | | |
|---|---|---|---|---|
| 5,612,606 | A * | 3/1997 | Guimarin et al. | 320/109 |
| 5,951,229 | A * | 9/1999 | Hammerslag | 414/398 |
| 8,454,377 | B2 * | 6/2013 | Heichal et al. | 439/247 |
| 8,517,132 | B2 * | 8/2013 | Heichal et al. | 180/68.5 |
| 2008/0294283 | A1 * | 11/2008 | Ligrano | 700/218 |
| 2009/0198372 | A1 * | 8/2009 | Hammerslag | 700/226 |
| 2010/0071979 | A1 * | 3/2010 | Heichal et al. | 180/68.5 |
| 2010/0141206 | A1 * | 6/2010 | Agassi et al. | 320/109 |
| 2012/0306445 | A1 * | 12/2012 | Park et al. | 320/109 |
| 2012/0316671 | A1 * | 12/2012 | Hammerslag et al. | 700/225 |

FOREIGN PATENT DOCUMENTS

| | | |
|---|---|---|
| KR | 10-2011-32024 | 4/2011 |
| KR | 10-2011-34994 | 4/2011 |
| KR | 10-2011-52913 | 6/2011 |

* cited by examiner

*Primary Examiner* — Peter DungBa Vo
*Assistant Examiner* — Kaying Kue
(74) *Attorney, Agent, or Firm* — Kile Park Reed & Houtterman PLLC (57) ABSTRACT

Provided is an electric bus battery exchange station. The electric bus battery exchange station according to the present invention includes: an exchange station body having a battery exchange, wherein said battery exchange unit is projected out to be connected with a hole of; an imaging unit taking images of the electric bus moving toward said exchange station body; an entry process storing unit storing entry process information needed in order that the electric bus is positioned exactly below the battery exchange unit; an entry information output unit comparing an entry state of the electric bus obtained from images taken by said imaging unit with the entry information stored, and outputting entry information for modifying the entry state of the electric bus to make equal to said entry process information; and an entry information providing unit providing information outputted by said entry information output unit to the electric bus.

4 Claims, 8 Drawing Sheets

ELECTRIC BUS BATTERY EXCHANGE STATION

CROSS-REFERENCE TO RELATED APPLICATION

This application claims priority under 35 U.S.C. §119 to Korean Patent Application No. 10-2012-0010069 filed on Jan. 31, 2012, the disclosure of which is hereby incorporated by reference in its entirety.

BACKGROUND

1. Field of the Invention

The present invention relates to an electric bus battery exchange station, and more particularly, relates to the electric bus battery exchange station that exchanges a discharged battery for a charged battery.

2. Description of Related Art

An electric bus refers to a bus powered by electric energy. The electric bus has an eco-friendly characteristic that does not emit harmful gases, compared with existing automobiles using fossil fuels. Thus, the research and commercialization of the electric bus is speeding up further.

For example, Seoul city has started the world's first electric bus since 2010, and is planning to expand the electric bus until 2014.

The electric buses that are being currently commercialized have a short mileage with one charge, so it is inevitable that they should stop by several battery exchange stations to get electric energy. However, stopping by the battery exchange station causes inconvenience to passengers, because it takes 30 minutes to charge a battery with current technology. Therefore, the electric buses are obliged to take a short route in order to not stop by the battery exchange station, or take only a flat route.

To solve above-mentioned problem, this applicant have proposed a battery exchange system that exchanges a discharged battery for a pre-charged battery. For instance, KR patent applications No. 2011-32024, No. 2011-34994, No. 2011-52913, etc are pending before the Korea patent office. According to the proposed technology, the battery is swapped quickly through a hole positioned on top of the electric bus for battery exchange, so that battery swapping can be completed during stoppage time for boarding. Therefore, there is no need to wait for battery swapping, and the electric bus can run effectively regardless of the length of route.

As mentioned above, when the battery is swapped through the hole positioned on top of the electric bus for battery exchange, it is necessary that the electric bus is positioned at exact place matched with a swapping point which is positioned above in order to exchange battery in a short time.

Therefore, this applicant proposes a battery exchange station that guides the electric bus to be positioned exactly at place matched with the swapping point without any equipment disturbing the route.

SUMMARY

The present invention is invented based on the above description, and an embodiment of the present invention is to provide an electric bus battery exchange station that guides the electric bus to be positioned exactly at place which is matched with the swapping point without any equipment disturbing the route, thereby reducing the time for battery exchange.

To achieve the embodiment of the present invention, provided is an electric bus battery exchange station including: an exchange station body having a battery exchange unit for removing a discharged battery and providing a charged battery, wherein the battery exchange unit is projected out to be connected with a hole of battery exchange disposed on top of an electric bus; an imaging unit taking images of the electric bus moving toward said exchange station body in order to exchange discharged battery; an entry process storing unit storing entry process information needed in order that the electric bus is positioned exactly below the battery exchange unit; an entry information output unit comparing an entry state of the electric bus obtained from images taken by said imaging unit with the entry information stored at said entry process storing unit, and outputting entry information for modifying the entry state of the electric bus to make equal to said entry process information; and an entry information providing unit providing information outputted by said entry information output unit to the electric bus.

The entry process information could include at least one of information of entry route, entry direction and speed of each section.

The electric bus battery exchange station could further include a reservation check unit confirming whether the electric bus has a reservation for battery exchange, and the imaging unit could take images of the electric bus confirmed to have the reservation by said reservation check unit.

The exchange station body could include the plurality of battery exchange units, and could further include an exchange position allocation unit selecting among said plural battery exchange units and allocating selected battery exchange unit to the electric bus as the position for exchanging the battery, and the entry information output unit outputs the entry information for positioning the electric bus below the selected battery exchange unit.

An electric bus battery exchange station according to the present invention provides the information in real time by imaging processing, which is for guiding an electric bus entering for exchanging a battery to a point of battery exchange, so that enables the electric bus to be positioned exactly at the point of battery exchange.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

Hereinafter, the embodiments of the present invention will be described in detail with reference to accompanying drawings.

Figure 1:
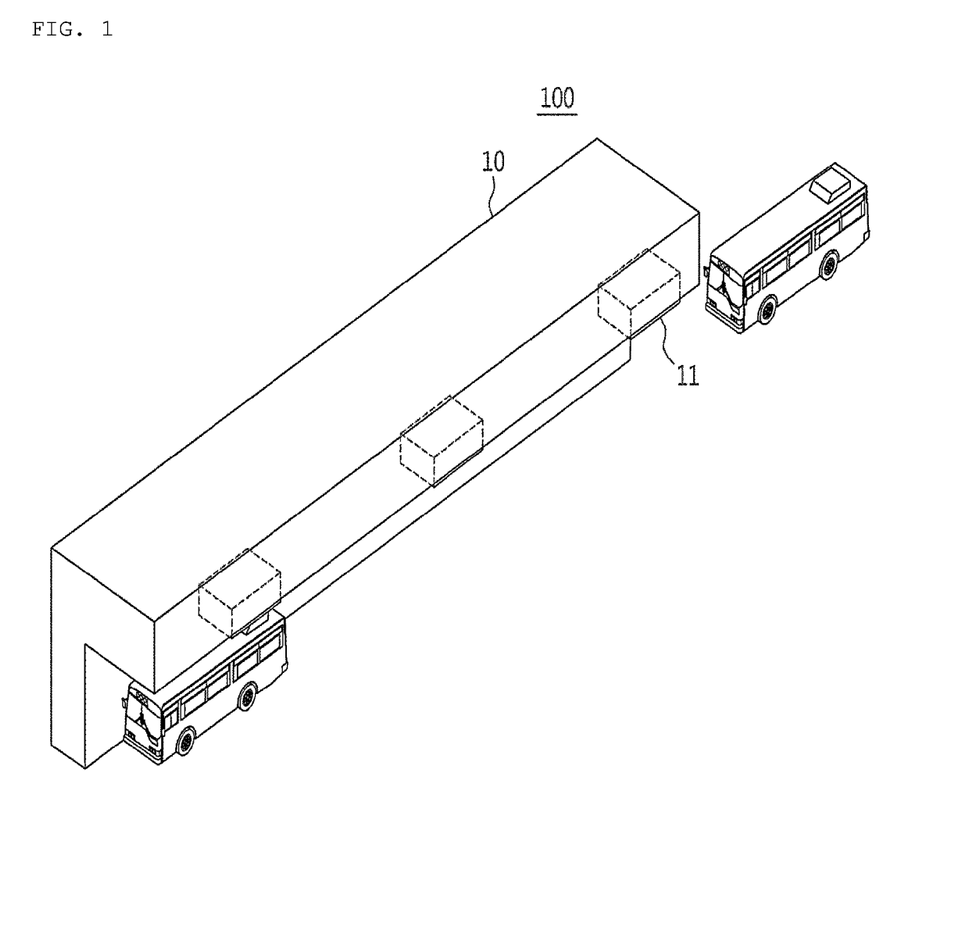
FIG. 1 to FIG. 3 are schematic views showing an electric bus battery exchange station according to an exemplary embodiment of the present invention.
Figure 2:
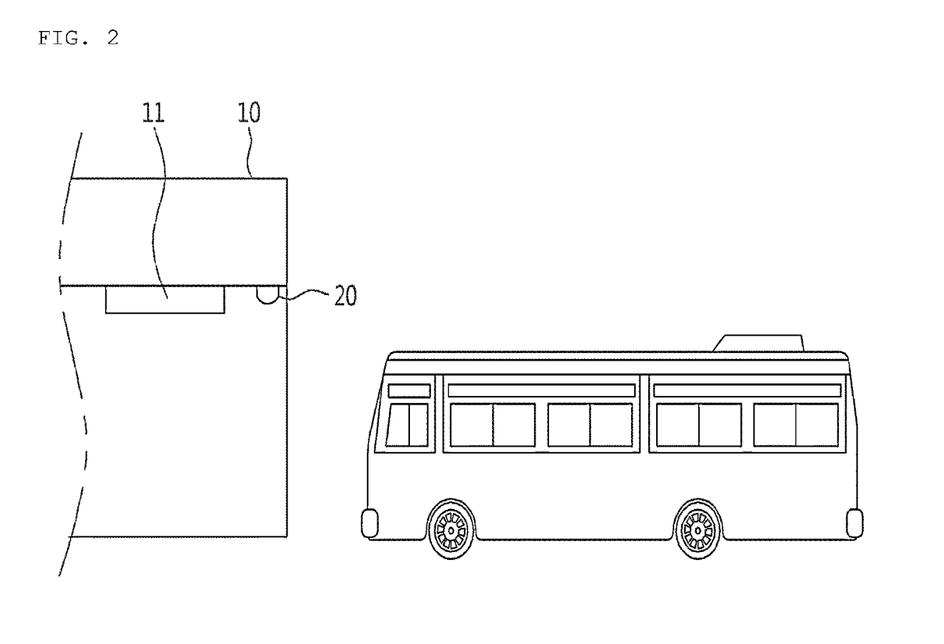
Figure 3:
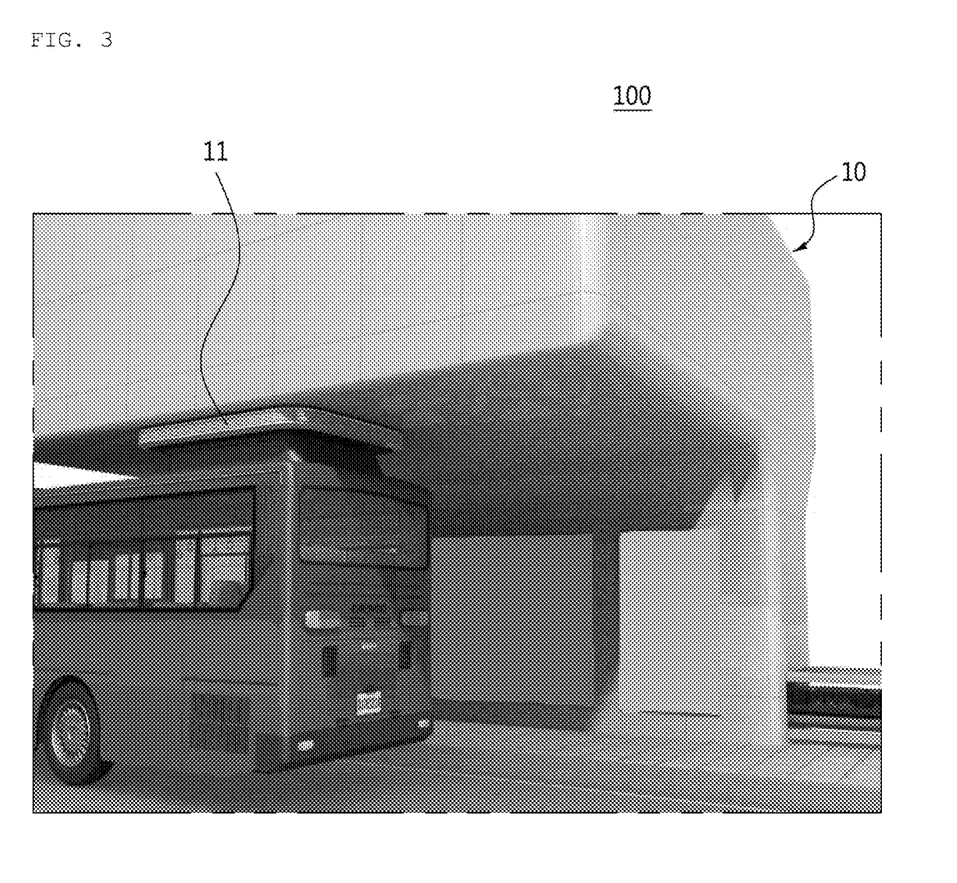
Figure 4:
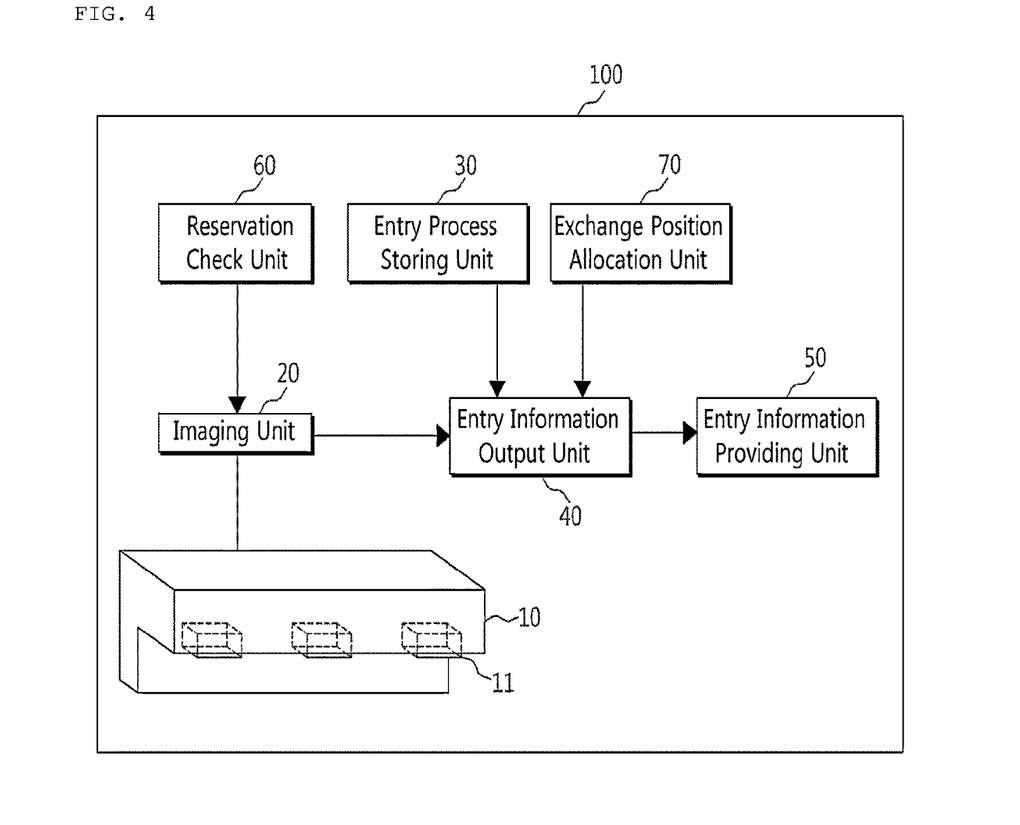
FIG. 4 is a block diagram showing the electric bus battery exchange station according to an exemplary embodiment.

FIG. 1 to FIG. 3 are schematic views showing an electric bus battery exchange station 100 according to an exemplary embodiment of the present invention, and FIG. 4 is a block diagram showing the electric bus battery exchange station 100 according to an exemplary embodiment of the present invention.

With reference to FIG. 1 to FIG. 4, the electric bus battery exchange station 100 according to the present invention includes an exchange station body 10, an imaging unit 20, an entry process storing unit 30, an entry information output unit 40, an entry information providing unit 50, a reservation check unit 60, and an exchange position allocation unit 70.

The exchange station body 10 is a structure where swapping operation is performed. When the electric bus enters the exchange station body 10, the exchange station body 100 exchanges a discharged battery for a charged battery. The exchange station body 10 includes a battery exchange unit 11 for exchanging batteries. The battery exchange unit 11 is connected with a hole for battery exchange, which is positioned on top of the electric bus, and exchanges the discharged battery for the charged battery through the hole. To achieve this, the battery exchange unit 11 is projected out to be connected with the hole positioned on top of the electric bus, and includes battery exchange robots for removal or installation of battery, which is not shown. The exchange station body 10 can include the plurality of battery exchange units 11, which help to save time by providing charged batteries to the several electric buses at the same time.

The exchange station body 10 is not restricted to its particular structure or shape. The exchange station body 10 can have diverse structures or shapes on the condition that the exchange station body 10 enables the electric bus to get in or get out conveniently and the battery exchange operation can be performed. According to the exemplary embodiment, the exchange station body 10 is configured to have a vertical body perpendicular to a road and a horizontal body extended from top of the vertical body to the road as shown in FIG. 1 to FIG. 4. Thus, the exchange station body 10 is able to exchange batteries in spite of bad weather.

The imaging unit 20 is to take images of the electric bus getting into the exchange station body 10 for battery exchange. To achieve this, the imaging unit 20 includes cameras, and the various types of cameras are applied for taking images. For example, CCD or CMOS camera can be applied. The imaging unit 20 obtains images of the electric bus when the electric bus gets into the exchange station body 10. The imaging unit 20 can include only one camera, and also can include the plurality of cameras. The cameras are disposed on each section, so that the cameras take images of the electric bus passing through the each section.

The images taken by the imaging unit 20 are used as criteria to analyze the progress of the electric bus, and to output the information for guiding the electric bus to exact position below the battery exchange unit 11. To achieve this, the cameras of the imaging unit 20 are positioned to be able to take images of entry-directions, entry-points of the electric bus and so on, and could be configured to be able to change the angle in order to take images in various angles or directions.

The entry process storing unit 30 stores the entry process information, which is needed in order that the electric bus is positioned exactly below the battery exchange unit 11. The entry process information refers process information needed in the process that the electric bus reaches the battery exchange unit 11. Hereinafter, the entry process information will be explained more in detail.

Figure 5:
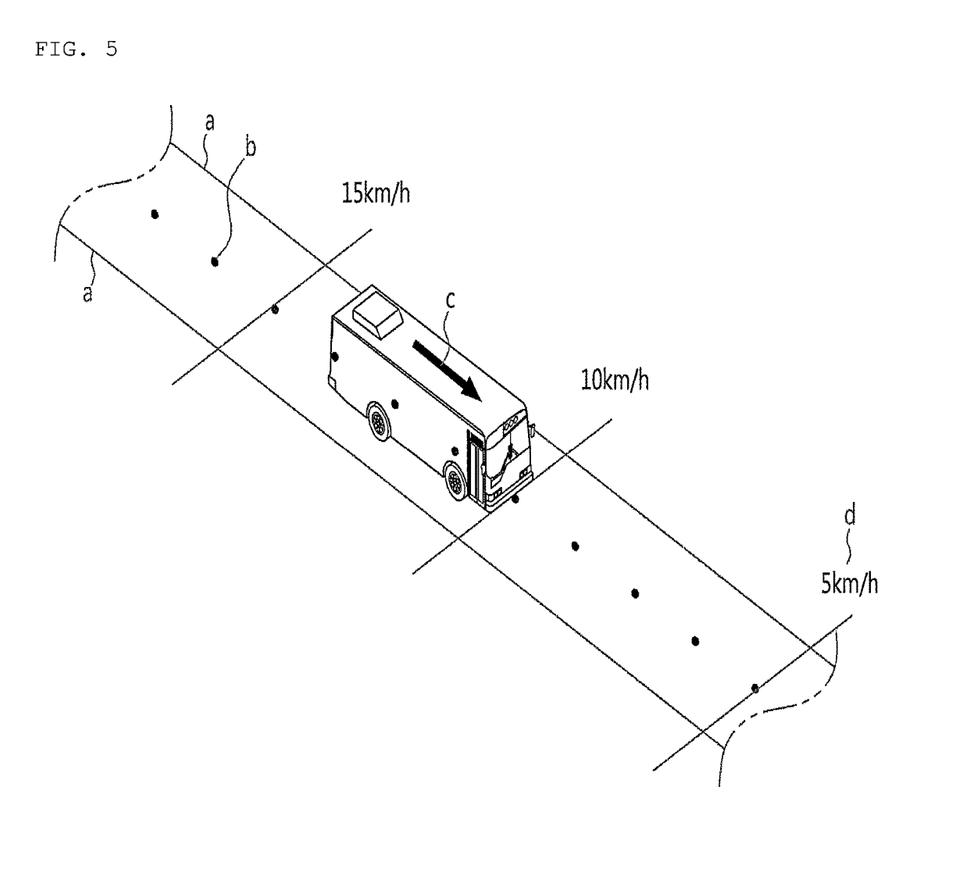
FIG. 5 shows an exemplary entry process information stored in the entry process storing unit.

FIG. 5 shows the exemplary entry process information stored in the entry process storing unit 30.

With reference to FIG. 5, the entry process information includes the information of entry route, entry point, entry direction and speed of each section. The information of entry route a is a route from beginning of entry of the electric bus to the exact point below the battery exchange unit 11. The entry process storing unit 30 stores the information of each entry route a according to the entry points of the electric bus, which is to situate the electric bus at exact point below the battery exchange unit 11.

The entry point b is a relative position of the electric bus, based on the entry route. For example, the entry process storing unit 30 could store the position information of the electric bus as the entry point b, which is the position of the electric bus when the electric bus is positioned at the center of the entry route.

The entry direction c is the direction of the electric bus, which indicates whether the electric bus is approaching straight to the battery exchange unit 11, in other words, whether the electric bus is twisted. The speed of each section d indicates that the recommended speed for electric bus at each section when the entry route a is divided into regular sections according to the distance from the battery exchange unit 11. The speed of each section d provides information of reducing speed, which enables the electric bus to stop at exact point below the battery exchange unit 11. For example, as shown in FIG. 5, the speed of each section should be reduced as the battery exchange unit 11 gets closer.

In case that the exchange station body 10 has the plurality of battery exchange units 11, the entry process storing unit 30 stores the entry process information as per each of the battery exchange units 11. Because a location of each of the battery units 11 differs from each other, the entry process information could be determined individually by the location of each of the battery units 11.

The entry information output unit 40 compares the entry state of the electric bus entering the exchange station body 10 with the entry process information stored in the entry process storing unit 30. The entry state of the electric is obtained from images taken by the imaging unit 20. After that, the entry information output unit 40 outputs entry information for modifying the entry state of the electric bus, so that the entry state of the electric bus is equal to the entry process information. Hereinafter, with reference to FIG. 6 to FIG. 8, a method of being outputted the entry information by the entry information output unit 40 will be explained.

Figure 6:
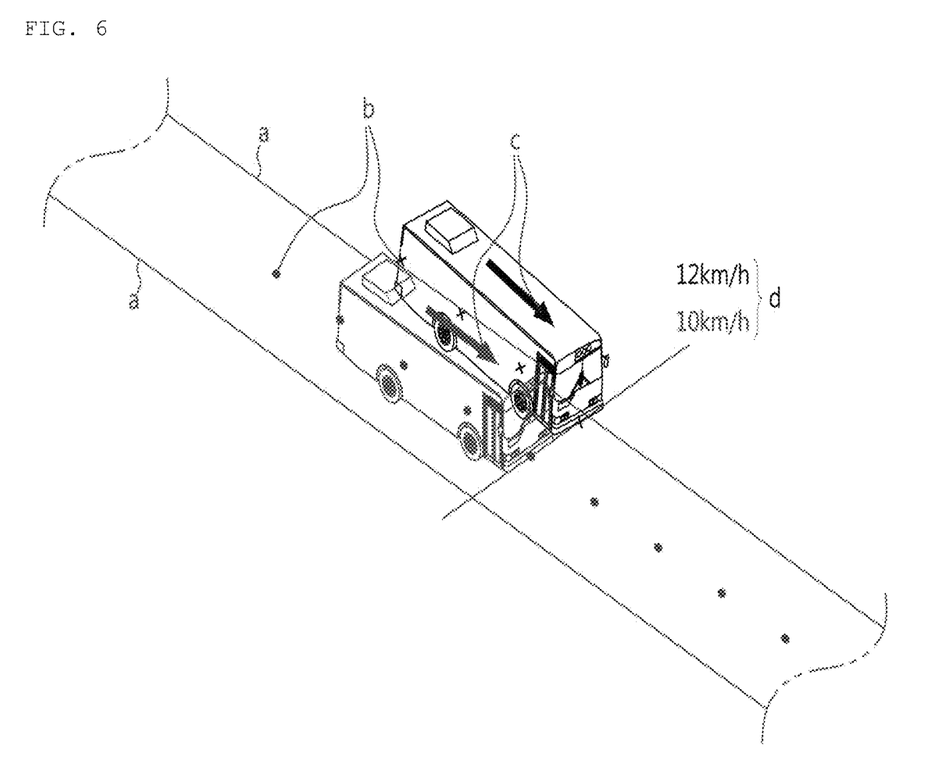
FIG. 6 to FIG. 8 are schematic views for explaining a method of being outputted an entry information by an entry information output unit according to an exemplary embodiment of the present invention.
Figure 7:
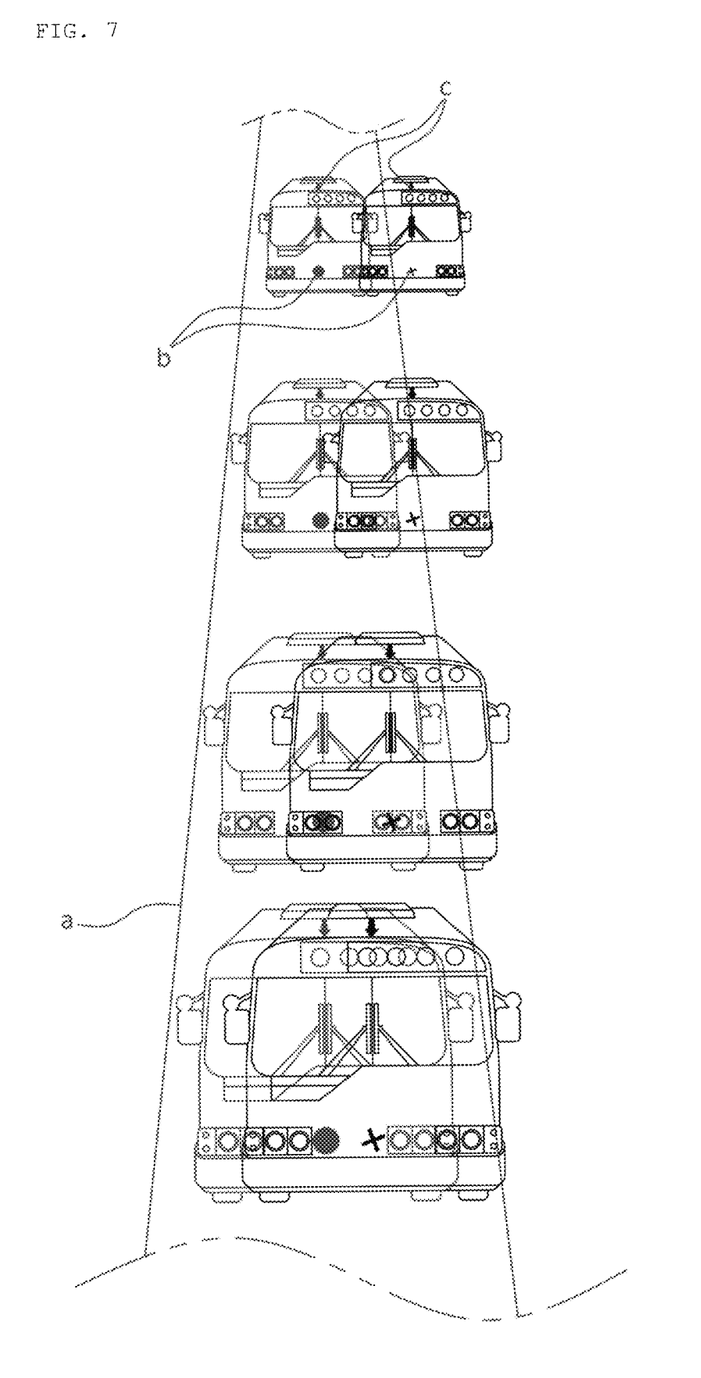
Figure 8:
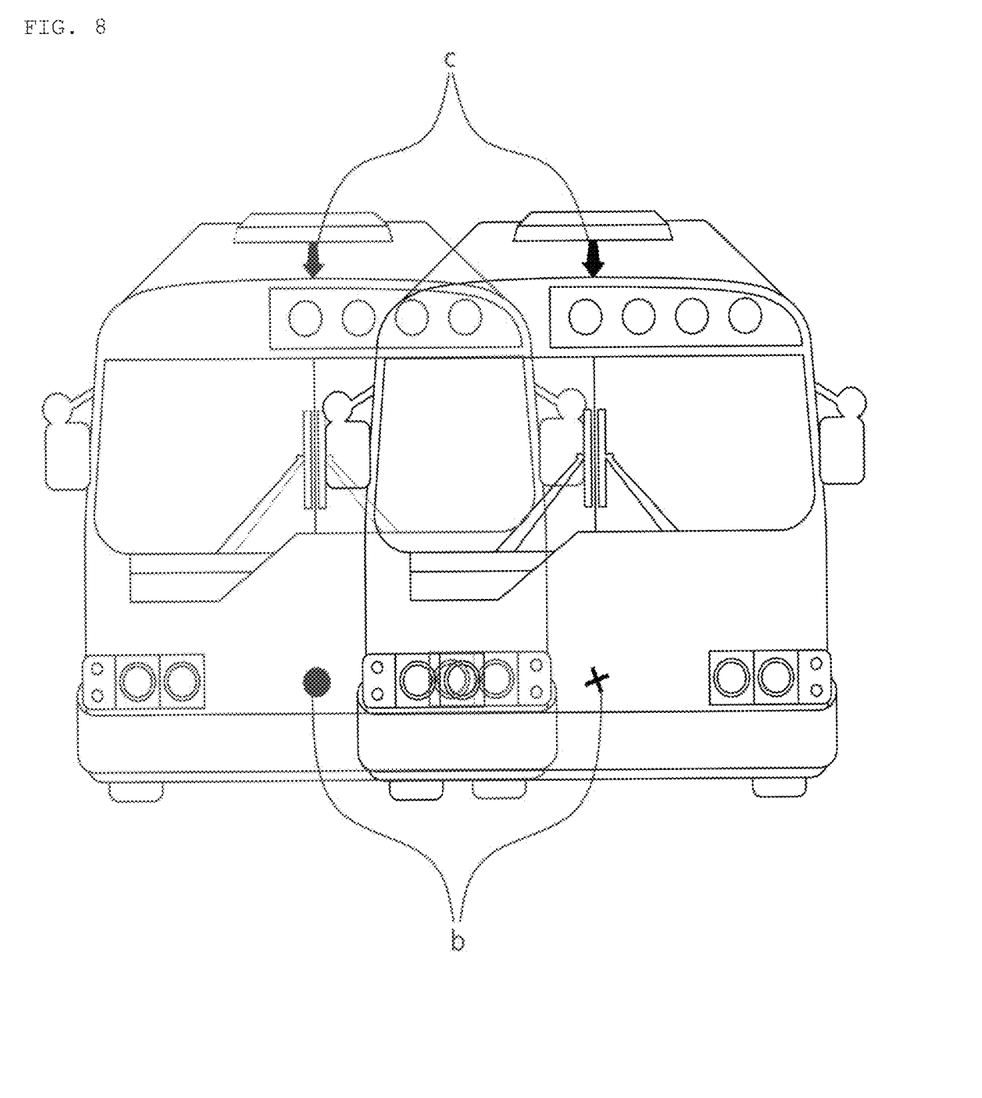

FIG. 6 to FIG. 8 are schematic views for explaining a method of being outputted the entry information by the entry information output unit 40 according to an exemplary embodiment of the present invention. In addition, the entry process information stored in the entry process storing unit 30 is shown in red to compare with the current entry state, which is shown in black.

With reference to FIG. 6 to FIG. 8, the entry information output unit 40 obtains a point where an entry of the electric bus begins by analyzing images taken by imaging unit 20, and outputs the entry route a corresponding to the point based on the information stored in the entry process storing unit 30. While the electric bus moves toward the battery exchange unit 11, the entry information output unit 40 compares in sequence the current entry point b, entry direction c, and speed of each section d of the electric bus, which are based on images taken by the imaging unit 20, with the information stored in the entry process storing unit 30. In case that the results of the comparisons are mismatched, the entry information output unit 40 outputs the information for modifying the current entry state to make equal to the information stored in the entry process storing unit 30.

For example, in case that the entry points b are mismatched each other, the entry information output unit 40 figures out how they are mismatched in direction of right or left, and outputs the distance and direction to which the electric bus should move to be matched each other. In case that the entry direction c or the speed at each section d is mismatched each other, the entry information output unit 40 outputs the direction and angle that the electric bus should be turned, and the speed that the electric bus should be decelerated respectively.

With reference to FIG. 1 to FIG. 4 again, the entry information providing unit 50 provides information outputted by entry information output unit 40 to the electric bus, so that the electric bus can modify the entry state based on the provided information. To achieve this, the entry information providing unit 50 includes means of wireless communication. The diverse methods of wireless communication can be applied as the means of wireless communication, including CDMA. The provided entry information could be displayed on the screen located in the electric bus.

The electric bus battery exchange station 100 according to the exemplary embodiment of the present invention can further include the reservation check unit 60, so that only when the reserved electric bus for battery exchange gets into the exchange station body 10, the electric bus battery exchange station 100 takes images of the electric bus and provides the information for guiding the electric bus. That is, when the entry of the electric bus is detected, the reservation check unit 60 transfers a signal to the electric bus to check whether the electric bus has a reservation for battery exchange, and receives a signal from the electric bus as a response. Only when the electric bus has been confirmed to have the reservation, the imaging unit 20 and the entry information output unit 40 is operated, thereby loads of the communication and power consumption is been reduced.

In case that the exchange station body 10 includes the plurality of battery exchange units 11, the exchange position allocation unit 70 selects among the battery exchange units 11 and allocates selected battery exchange unit 11 to the electric bus as the position for exchanging the battery. To achieve this, the exchange station body 10 stores information about battery-exchange-state of the battery exchange units 11, which is helpful to minimize the waiting time for battery exchange and enables the electric bus battery exchange station 100 to manage effectively by allocating the battery exchange unit 11 relatively easy to access. In addition, the exchange position allocation unit 70 could reallocate the battery exchange unit 11, in case that the pre-allocated battery exchange unit 11 has to be changed.

The entry information output unit 40 outputs the entry information to guide the electric bus to the exact point below the battery exchange unit 11 allocated by the allocation unit 70. To achieve this, the entry information output unit 40 outputs the entry information based on the entry process information stored in the entry process storing unit 30, which corresponds to the allocated battery exchange unit 11.

The above description is suggested only as an exemplary embodiment for realizing the electric bus battery exchange station 100 according to the present invention described above. The present invention is not limited to the exemplary embodiment. It will be apparent that various changes and modifications may be made by those skilled in the art without deviating from the basic concept and scope of the invention as set forth in the appended claims.

What is claimed is:

1. An electric bus battery exchange station having an imaging unit, comprising:
    an exchange station body having a battery exchange unit for removing a discharged battery and providing a charged battery, wherein said battery exchange unit is projected out to be connected with a hole of battery exchange disposed on top of an electric bus;
    said imaging unit taking images of the electric bus moving toward said exchange station body in order to exchange discharged battery;
    an entry process storing unit storing entry process information needed in order that the electric bus is positioned exactly below the battery exchange unit;
    an entry information output unit comparing an entry state of the electric bus obtained from images taken by said imaging unit with the entry information stored at said entry process storing unit, and outputting entry information for modifying the entry state of the electric bus to make equal to said entry process information; and
    an entry information providing unit providing information outputted by said entry information output unit to the electric bus.

2. The electric bus battery exchange station of claim 1, wherein said entry process information comprises at least one of information of entry route, entry direction and speed of each section.

3. The electric bus battery exchange station of claim 1, further comprises a reservation check unit confirming whether the electric bus has a reservation for battery exchange, and wherein said imaging unit takes images of the electric bus confirmed to have the reservation by said reservation check unit.

4. The electric bus battery exchange station of claim 1, wherein said exchange station body comprises the plurality of battery exchange units, and further comprises an exchange position allocation unit selecting among said plural battery exchange units and allocating selected battery exchange unit to the electric bus as the position for exchanging the battery, and wherein said entry information output unit outputs the entry information for positioning the electric bus below the selected battery exchange unit.

* * * * *